United States Patent
Cho

(10) Patent No.: US 9,850,966 B2
(45) Date of Patent: Dec. 26, 2017

(54) CONTROL SYSTEM AND CONTROL METHOD FOR REDUCING RATTLE NOISE OF BRAKE CALIPER

(71) Applicant: Hyundai Motor Company, Seoul (KR)

(72) Inventor: Sung Hyun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 14/925,810

(22) Filed: Oct. 28, 2015

(65) Prior Publication Data

US 2016/0290422 A1 Oct. 6, 2016

(30) Foreign Application Priority Data

Apr. 2, 2015 (KR) .................. 10-2015-0046793

(51) Int. Cl.
| | |
|---|---|
| *F16D 65/00* | (2006.01) |
| *B60T 8/171* | (2006.01) |
| *B60T 8/176* | (2006.01) |
| *B60T 8/88* | (2006.01) |

(52) U.S. Cl.
CPC .......... *F16D 65/0006* (2013.01); *B60T 8/171* (2013.01); *B60T 8/176* (2013.01); *B60T 8/885* (2013.01)

(58) Field of Classification Search
CPC ...... F16D 65/0006; B60T 8/171; B60T 8/176; B60T 8/885
See application file for complete search history.

(56) References Cited

U.S. PATENT DOCUMENTS

| | | | |
|---|---|---|---|
| 5,664,850 A | 9/1997 | Kuno et al. | |
| 2010/0066164 A1* | 3/2010 | Kokubo | B60T 8/36 303/191 |

FOREIGN PATENT DOCUMENTS

| | | | |
|---|---|---|---|
| JP | 10-226328 | A | 8/1998 |
| JP | 2004-284476 | A | 10/2004 |
| JP | 2004-286141 | A | 10/2004 |
| JP | 2014-532586 | A | 12/2014 |
| KR | 10-1996-0017300 | A | 6/1996 |
| KR | 10-1998-0041404 | A | 8/1998 |
| KR | 10-0220982 | B1 | 9/1999 |
| KR | 10-1999-0086835 | A | 12/1999 |
| KR | 10-0717315 | B1 | 5/2007 |
| KR | 10-2009-0126886 | A | 12/2009 |

(Continued)

*Primary Examiner* — Basil T Jos
(74) *Attorney, Agent, or Firm* — Morgan, Lewis & Bockius LLP

(57) ABSTRACT

A control system for reducing rattle noise of a brake caliper may include a wheel speed sensor configured to detect a wheel speed of each wheel to which a caliper device is mounted, a controller configured to determine a vibration level value according to a road surface state by processing and analyzing a wheel speed signal received from the wheel speed sensor, and, when the road surface state of the road is determined as one in which unevenness exists, output a control signal for applying oil pressure for preventing rattle noise to a wheel cylinder of a brake device, a braking driver configured to generate and supply the oil pressure for preventing rattle noise according to the control signal output from the controller, and the wheel cylinder of the brake device, to which the oil pressure for preventing rattle noise, which is supplied by the braking driver, is applied.

15 Claims, 3 Drawing Sheets

(56) References Cited

FOREIGN PATENT DOCUMENTS

| KR | 10-2010-0004151 A | 1/2010 |
|----|-------------------|--------|
| KR | 10-2013-0083321 A | 7/2013 |
| KR | 10-1405205 B1 | 6/2014 |
| KR | 10-1484224 B1 | 1/2015 |
| WO | WO 2013/067094 A1 | 5/2013 |

\* cited by examiner

CONTROL SYSTEM AND CONTROL METHOD FOR REDUCING RATTLE NOISE OF BRAKE CALIPER

CROSS-REFERENCE TO RELATED APPLICATION

The present application claims priority to Korean Patent Application No. 10-2015-0046793 filed Apr. 2, 2015, the entire contents of which is incorporated herein for all purposes by this reference.

BACKGROUND OF THE INVENTION

Field of the Invention

The present invention relates to a control system and a control method for reducing rattle noise of a brake caliper. More particularly, it relates to a control system and a control method for reducing rattle noise of a brake caliper, which can effectively reduce vibration and noise generated due to clearances between components of a caliper device.

Description of Related Art

In general, a brake device is an important device used to decelerate or stop a driving vehicle, and a disk brake and drum brake, which are hydraulic brakes, are widely used as examples of the brake device.

Recently, with an increasing tendency toward speed up of vehicles, the disk brake having the degradation of braking power due to heat dissipation and thermal distortion, which is low as compared with the drum brake, has come into frequent use.

The disk brake is a brake device that stops the rotation of a disk by allowing brake pads to be forcibly adhered closely to both surfaces of the disk, thereby braking a vehicle. The disk brake includes a disk integrally rotating with a wheel, and a caliper device for braking the disk by means of friction obtained by pressing brake pads onto the disk.

Here, the caliper device includes a carrier (or referred to as a torque member) fixed to a vehicle body, brake pads disposed inside the carrier, the braking pads generating braking power by pressing both surfaces of a disk, and a caliper housing (or referred to as a caliper body) having a piston installed therein.

In the caliper device, the brake pads are configured with an inner pad positioned a side of the piston and an outer pad positioned at the opposite side of the inner pad. The carrier is configured so that the inner and outer pads are disposed with the disk interposed therebetween.

The piston for delivering hydraulic power generated by a wheel cylinder to the inner and outer pads is installed in the caliper housing. In the caliper housing, a reaction force support platform is formed at the opposite side of the piston.

In the configuration described above, if the wheel cylinder is operated by hydraulic power, the piston advances and presses the inner pad. The inner pad is adhered closely to the disk by the operation of the piston, and simultaneously, the caliper housing allows the outer pad to be adhered closely to the disk at the opposite side of the disk through the reaction force support platform while moving due to reaction of the adhesion.

As a result, the pads are adhered closely to both the surfaces of the disk, so that the braking of the vehicle is performed by friction caused by the adhesion.

Meanwhile, if a clearance (gap) between components of the caliper device increased by a knock-back of the piston of the caliper device, vibration and rattle noise may be generated due to the clearance when the vehicle is driven on a road surface having unevenness.

In the caliper device applied to the disk brake, when break oil pressure is applied to the wheel cylinder, the piston advances to move the pads and the caliper housing so that braking friction against the disk is generated.

On the other hand, if the application of the brake oil pressure is released, the pads are separated from the disk while the positions of the piston, the pads, and the caliper housing are restored, so that the braking friction is not generated. In this instance, the components constituting the caliper device are in a free state having clearances, i.e., a floating state.

The clearance (gap) between the components is a portion necessarily required to perform functions of the caliper device. When the application of the brake oil pressure is released, the pads are separated from the disk due to a knock-back in which the position of each component is restored, particularly a knock-back in which the position of the piston is restored by moving back. In this state, the components are in the floating state, and therefore, vibration and rattle noise may be generated due the clearance when the vehicle is driven on an uneven road surface.

However, when the brake operates, particularly, when the piston advances due to the brake oil pressure applied to the wheel cylinder, clearances between components are reduced, and the floating state is released. Thus, the rattle noise is not generated.

Such noise, particularly rattle noise generated in the caliper device may be generated between components having a clearance in the state in which the application of the brake oil pressure is released and the floating state. Examples of the rattle noise may be a beat sound between a guide rod and the caliper housing, a beat sound between the pad and the carrier, and a beat sound between the pad and the caliper housing/piston.

FIG. 1A and FIG. 1B are diagrams illustrating portions at which noises are generated due to clearances in a caliper device. FIG. 1A illustrates the generation of a beat sound between a guide rod 6 and a caliper housing 1, and FIG. 1B illustrates the generation of a beat sound between a pad 3 and the caliper housing 1 and a beat sound between a pad 2 and a piston 4.

As conventional arts for preventing such noises, there are used a method for reinforcing damping by applying a boot 7 or adding a bush 8, a method for reducing a gap by increasing the external diameter of the bush 8, a method for binding the caliper housing 1 and a carrier 5 to a level where vibration is not generated while permitting relative movement between the caliper housing 1 and the carrier 5 by connecting between the caliper housing 1 and the carrier 5 using a clip, a method for binding the inner pad 2 and the piston 4 by connecting between the inner pad 2 and the piston 4 using a clip, a method for reducing a gap between the guide rod 6 and the carrier 5, a method for adhering between the caliper housing 1 and the pad 3 using a double-faced adhesive shim, a method for minimizing a gap permissible range between components, and the like.

However, according to the conventional arts, cost may increase due to the use of the boot 7, the bush 8, the clip, the double-faced adhesive shim, and the like, and cost and time required to manage a process for minimizing the gap permissible range may increase.

In addition, the response of operation of the caliper device may be deteriorated due to the use of the boot 7 and the bush 8, the reduction of the gap, and the like, and the productivity and durability may be lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control system and a control method for reducing rattle noise of a brake caliper, which can effectively reduce vibration and noise generated due to clearances between components of a caliper device without applying an additional component such as a double-faced adhesive shim, a boot or a bush or applying a method for reducing a gap between components.

According to various aspects of the present invention, a control system for reducing rattle noise of a brake caliper may include a wheel speed sensor configured to detect a wheel speed of each wheel to which a caliper device is configured to be mounted, a controller configured to determine a vibration level value according to a road surface state of a road on which a vehicle is driven by processing and analyzing a wheel speed signal received from the wheel speed sensor, and, when the road surface state of the road is determined as a road surface state in which unevenness exists from the determined vibration level value, output a control signal for applying oil pressure for preventing rattle noise to a wheel cylinder of a brake device provided to the wheel, a braking driver configured to generate and supply the oil pressure for preventing rattle noise according to the control signal output from the controller, and the wheel cylinder of the brake device, to which the oil pressure for preventing rattle noise, which is supplied by the braking driver, is applied.

The controller may be configured to convert the wheel speed signal received from the wheel speed sensor into an acceleration signal, and, when a vibration level value evaluated by processing and analyzing the acceleration signal is not less than a setting value, determine the road surface state of the road as a road surface state in which unevenness exists.

The vibration level value may be a PSD (power spectral density) value evaluated by performing PSD analysis on the acceleration signal.

When the road surface state in which the unevenness exists is determined from the vibration level value, the controller may output a control signal for periodically applying the oil pressure for preventing rattle noise.

Vibration level ranges of a plurality of vibration level steps divided based on the vibration level value may be previously set in the controller, and a period may be set for each vibration level step, so that the period of a step to which the vibration level value evaluated from the wheel speed signal is used as a period for applying the oil pressure for preventing rattle noise.

An oil pressure value for preventing rattle noise, which is to be applied to the wheel cylinder, and an oil pressure application time may be set together with the period for each step.

According to various aspects of the present invention, a control method for reducing rattle noise of a brake caliper may include detecting, by a wheel speed sensor, a wheel speed of each wheel to which a caliper device is configured to be mounted, determining, by a controller, a vibration level value according to a road surface of a road on which a vehicle is driven by processing and analyzing a wheel speed signal, and when the road surface state of the road is determined as a road surface state in which unevenness exists from the determined vibration level value, applying oil pressure for preventing rattle noise to a wheel cylinder of a brake device provided to the wheel.

The wheel speed signal may be converted into an acceleration signal, and, when a vibration level value evaluated by processing and analyzing the acceleration signal is not less than a setting value, the road surface state of the road may be determined as a road surface state in which unevenness exists.

When the road surface state of the road is determined as the road surface state in which the unevenness exists, the oil pressure for preventing rattle noise may be applied in a predetermined period.

Vibration level ranges of a plurality of vibration level steps divided based on the vibration level value may be previously set, and a period is set for each vibration level step, so that the oil pressure for preventing rattle noise may be intermittently applied every period of a step to which the vibration level value evaluated from the wheel speed signal.

As the range of the vibration level value is increased, the period for applying the oil pressure for preventing noise may be set to be decreased.

The oil pressure for preventing rattle noise may be set as a minimum oil pressure capable of preventing rattle noise generated due to clearances between components by releasing a floating state of the components configured to be in the caliper device.

The oil pressure for preventing rattle noise may be set as oil pressure at which a piston of the caliper device is configured to be moved to a level where braking power against the vehicle is not generated.

In the control system and control method according to the present invention, oil pressure of the minimum level for preventing rattle noise of the wheel cylinder is intermittently applied under a condition in which rattle noise of the caliper device may be generated, so that it is possible to reduce vibration in a software manner without applying an additional component such as a double-faced adhesive shim, a boot or a bush or applying a method for reducing a gap between components.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a control system and a control method for reducing rattle noise of a brake caliper, which can effectively reduce vibration and noise generated due to clearances between components of a caliper device.

Figure 1A:
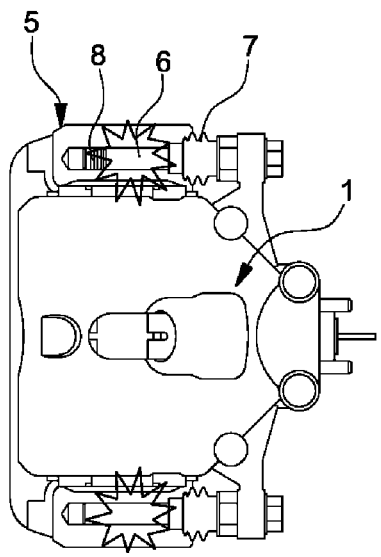
FIG. 1A and FIG. 1B are diagrams illustrating portions at which noises are generated due to clearances in a caliper device according to the related art.
Figure 1B:
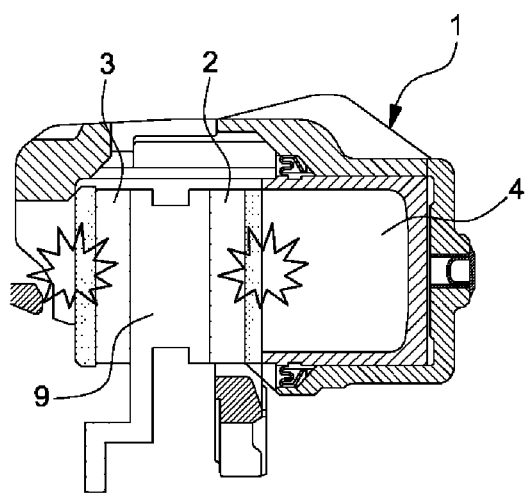
Figure 2:
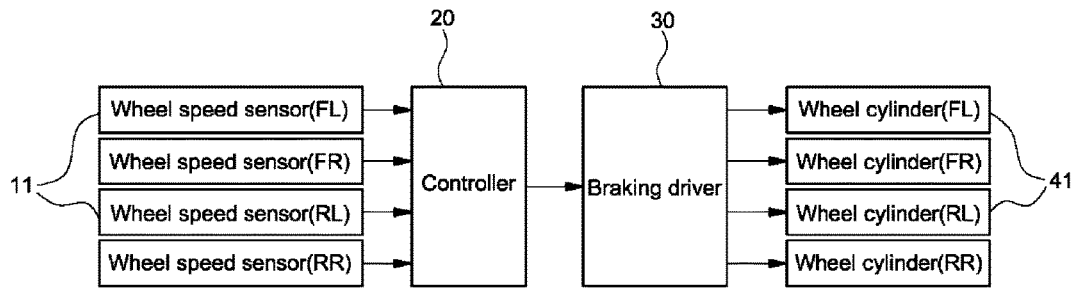
FIG. 2 is a block diagram illustrating a configuration of an exemplary control system for reducing rattle noise according to the present invention.
Figure 3:
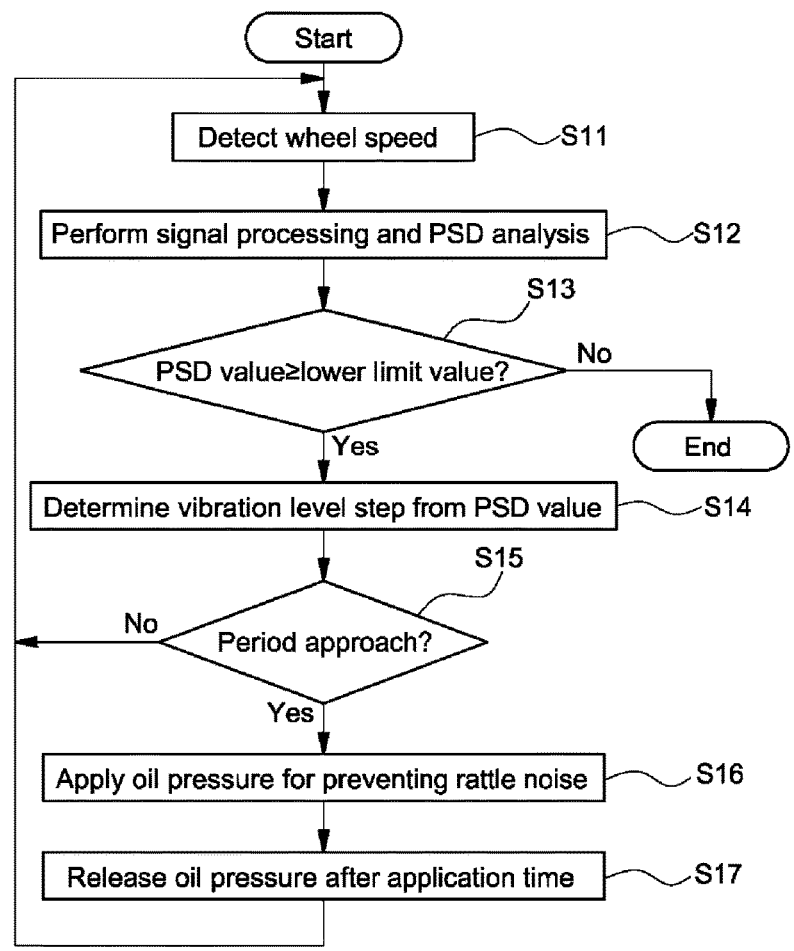
FIG. 3 is a flowchart illustrating an exemplary control method for reducing rattle noise according to the present invention.

FIG. 2 is a block diagram illustrating a configuration of a control system for reducing rattle noise according to various embodiments of the present invention. FIG. 3 is a flowchart illustrating a control method for reducing rattle noise according to various embodiments of the present invention.

First, as shown in FIG. 2, the control system of the present invention is a system for preventing rattle noise generated in a caliper device of a brake device (disk brake), and includes wheel speed sensors 11, a controller 20, a braking driver 30, and wheel cylinders 41.

The wheel speed sensor 11 is provided to detect a wheel speed of each wheel having the brake device (and the caliper device) mounted thereto. For example, when the disk brake including a disk and a caliper device is mounted to a front left wheel FL, a front right wheel FR, a rear left wheel RL or a rear right wheel RR, the wheel speed sensor 11 is mounted to each wheel to detect a wheel speed of the corresponding wheel and output an electrical signal according to the detected wheel speed.

The controller 20 processes and analyzes a signal of the wheel speed sensor 11 mounted to each wheel, i.e., wheel speed signal input from the wheel speed sensor 11, and calculates a vibration level value according to a road surface state of a road on which a vehicle is driven.

Here, the wheel speed signal of each wheel, obtained from the wheel speed sensor 11 in the state in which the vehicle is driven on the road is used to determine a road surface state of the road. When the vibration level value evaluated from the wheel speed signal is not less than a setting value (lower limit value which will be described later), the controller 20 determines that the road surface state of the road is a road surface state in which unevenness exists.

When it is determined that the road surface state of the road is a road surface state in which unevenness exist, the controller 20 outputs a control signal for applying oil pressure to the brake device of the corresponding wheel. Here, the oil pressure is applied to prevent rattle noise that may be generated by clearances between components of a caliper housing.

The oil pressure for preventing rattle noise may be previously set to an oil pressure level where a piston can minutely advance to a level where braking power of the vehicle is not generated, i.e., a level where a pad does not apply large braking friction to the disk.

In this case, a minimum liquid pressure capable of preventing rattle noise generated due to clearances between components may be evaluated through previous test and researches and then set to the oil pressure for preventing rattle noise.

The braking driver 30 is configured to supply oil pressure for preventing rattle noise to the wheel cylinder 41 of each caliper device. The braking driver 30 may include a pump for generating oil pressure in the vehicle, a valve for controlling the supply of the oil pressure to the brake device, and an oil pressure pipe for supplying the oil pressure.

In the present invention, the operation of the braking driver 30, more specifically the driving of the pump (pump motor) is controlled according to the control signal output from the controller 20 during the driving of the vehicle in order to apply the oil pressure for preventing rattle noise regardless of a driver's manipulation of a brake pedal.

In addition, the operation of the valve is controlled so that the oil pressure for preventing rattle noise, generated by the driving of the pump according to the control signal output from the controller 20, can be applied to the brake device of the corresponding wheel.

The braking driver 30 applies the oil pressure for preventing rattle noise to the wheel cylinder 41 for operating the piston of the caliper device to move forward/backward. Accordingly, the piston advances under a condition in which braking power against the vehicle is not generated, so that the floating state of components is released to a predetermined level while reducing clearances between components. Thus, it is possible to suppress the generation of rattle noise due to the clearances.

In this case, minute braking friction may be generated between the pad and the disk due to the application of the oil pressure. Therefore, in order to minimize influence of the braking friction on driving of the vehicle and loss of fuel efficiency due to the generation of braking friction, the operation of preventing rattle noise may be intermittently performed. That is, the oil pressure for preventing rattle noise may be intermittently applied.

When it is determined that the road surface of a road on which the vehicle is driven is a road surface having unevenness, the controller 20 controls the oil pressure for preventing rattle noise to be applied for a predetermined short time. In this instance, the controller 20 outputs a control signal for controlling the oil pressure for preventing rattle noise to be applied in a period determined according to a degree of the unevenness of the road surface, i.e., a period determined according to a vibration level value.

To this end, a plurality of vibration level steps divided based on the vibration level value are previously set in software of the controller 20, and a period is previously set for each vibration level step. Thus, it is possible to select and apply the period of a vibration level step to which the vibration level value evaluated from the wheel speed signal belongs.

In various embodiments, the vibration level value may be a power spectral density (hereinafter, referred to as 'PSD') value evaluated by processing and analyzing a wheel speed signal.

In the software of the controller 20, an acceleration signal is evaluated from a wheel speed signal detected by the wheel speed sensor 11 during the driving of the vehicle, and a PSD value is calculated by processing and analyzing the acceleration signal. Then, if a period corresponding to the PSD value is evaluated, a control signal for intermittently applying oil pressure for preventing rattle noise is output from the controller 20 based on the period.

Various methods are known as the method for determining the PSD value of an arbitrary signal. In the present invention, there may be used a method of performing fast Fourier transform (FFT) on an acceleration signal and then calculating a PSD value from the FFT result.

However, the present invention is not limited to the method using FFT in the calculation of a PSD value, and any one of the known methods may be unlimitedly employed as the method of calculating the PSD value as long as it is a method capable of calculating a PSD value from an arbitrary frequency signal such as an acceleration signal.

Figure 4:
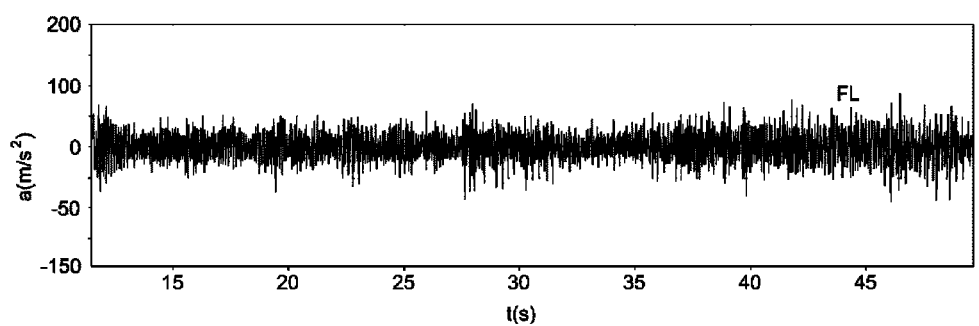
FIG. 4 is a diagram illustrating an acceleration signal obtained from a signal of a wheel speed sensor according to the present invention.
Figure 5:
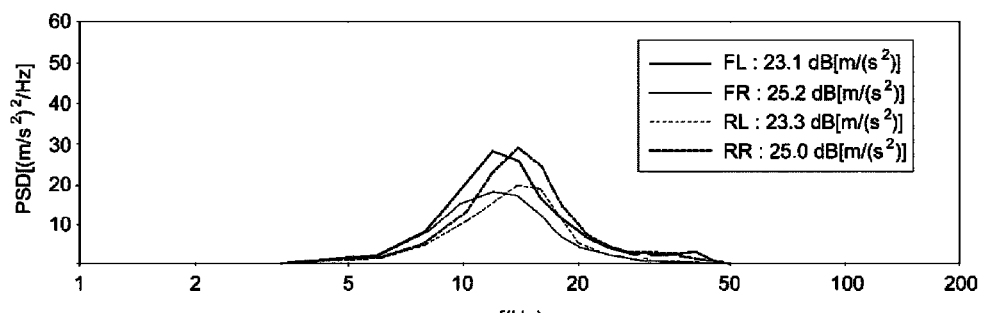
FIG. 5 is a diagram illustrating power spectral density (PSD) analysis results according to the present invention.

FIG. 4 is a diagram illustrating an acceleration signal obtained from a signal of the wheel speed sensor, i.e., a wheel speed signal according to the present invention. FIG. 5 is a diagram illustrating PSD analysis results according to the present invention.

Referring to FIG. 4, there is illustrated an acceleration signal obtained with respect to the front left wheel FL. Referring to FIG. 5, there are illustrated PSD curves obtained by performing FFT processing and PSD analysis on acceleration signals obtained with respect to the wheels FL, FR, RL and RR.

In FIG. 4, the inordinate axis represents time t and the abscissa axis represents acceleration a. In FIG. 5, the inordinate axis represents frequency f and the abscissa axis represents PSD.

The PSD representing a vibration level value may be evaluated as a peak value of a PSD curve as shown in FIG. 5. If the period of a vibration level step belonging to the evaluated PSD value is determined, oil pressure for preventing noise is repetitively applied for a predetermined time every determined period.

As an example, the following Table 1 illustrates, for each vibration level step, a PSD range ($g^2$/Hz, where g=m/sec$^2$), a period (sec) for applying oil pressure, oil pressure value (bar) for preventing noise, and an application time (sec).

TABLE 1

| Vibration level step | PSD range ($g^2$/Hz) | Period (sec) | Oil Pressure (bar) | Application time (sec) |
|---|---|---|---|---|
| HIGH | Over 20 | 5 | 0.6 | 0.01 |
| MIDDLE | 10~20 | 10 | 0.6 | 0.01 |
| LOW | Not less than lower limit value and less than 10 | 15 | 0.6 | 0.01 |

As illustrated in Table 1, the vibration level step is divided into three steps of high, middle, and low, and a PSD range corresponding to each vibration level is set.

Also, a period for applying the oil pressure for preventing noise, an oil pressure value, and an application time are set for each vibration level step, and a lower limit value (setting value) is set as the lowest vibration level value (PSD value) obtained by reflecting a road surface state in which noise of the caliper device may be generated when brake oil pressure (braking pressure) is released during driving of the vehicle.

As the range of the vibration level value (PSD value) is increased, the period for applying the oil pressure for preventing noise may be set to be gradually decreased.

Here, the noise means rattle noise generated in the floating state of components of the caliper device and the state in which clearances between components exist.

When the PSD value according to a road surface state of a current road on which the vehicle is driven is not less than the lower limit value, it is determined that the road surface condition of the road is an unevenness road surface condition where rattle noise may be generated, so that the oil pressure for preventing rattle noise is applied under the condition of a corresponding vibration level step.

In Table 1, setting values such a PSD range, a period, an oil pressure value for preventing rattle noise, and an application time, which are defined for each vibration level step, are provided only for illustrative purposes, and the present invention is not limited thereto. Each setting value may be variously corrected and modified.

As such, the configuration of the control system for reducing rattle noise according to the present invention has been described. Therefore, the wheel speed sensors 11, the controller 20, and the braking driver 30 may be used as components of an electronic stability control system (ESC) previously mounted in the vehicle.

That is, the wheel speed sensor 11 of each wheel is included as a component of the ESC. In addition, the components of the braking driver 30 for generating oil pressure and supplying the generated oil pressure to the brake device, i.e., the pump, the valve, the oil pressure pipe, and the like are included as components of the ESC. In this case, the controller 20 of the present invention may be an ESC controller (ESC ECU) for performing vehicle braking control.

Hereinafter, the control method of the present invention will be described with reference to FIG. 3.

First, a wheel speed of each wheel is detected through the wheel speed sensor 11 during driving of the vehicle (S11), and the controller 20 receives, in real time, a wheel speed signal output from each wheel speed sensor 11.

In this instance, the controller 20 converts the wheel speed signal into an acceleration signal and then calculates, in real time, a vibration level value through an additional signal processing and analysis process, i.e., a PSD value through PSD analysis (S12).

Subsequently, when the PSD value calculated for each wheel is not less than a predetermined lower limit value, the controller 20 determines a corresponding vibration level step from the PSD value (S13 and S14), and intermittently applies oil pressure for preventing rattle noise to the disk brake of the corresponding wheel under a condition corresponding to the determined vibration level step.

If the period of the corresponding vibration level step approaches a predetermined period from a point of time when oil pressure was previously applied, the oil pressure for preventing rattle noise is applied to the wheel cylinder 41 of the corresponding wheel for a predetermined application time (S15 and S16). After the application time elapses, the oil pressure is released (S17).

When the PSD value is less than the lower limit value (setting value), it is determined that the road surface condition of a road is a road surface condition where rattle noise is not generated, so that the oil pressure for preventing rattle noise is not applied.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control system for reducing rattle noise of a brake caliper, the control system comprising:
   a wheel speed sensor configured to detect a wheel speed of each wheel to which a caliper device is configured to be mounted;
   a controller configured to determine a vibration level value according to a road surface state of a road on which a vehicle is driven by processing and analyzing a wheel speed signal received from the wheel speed sensor, and, when the road surface state of the road is determined as a road surface state in which unevenness exists from the determined vibration level value, output a control signal for applying oil pressure for preventing rattle noise to a wheel cylinder of a brake device provided to the wheel;
   a braking driver configured to generate and supply the oil pressure for preventing rattle noise according to the control signal output from the controller; and
   the wheel cylinder of the brake device, to which the oil pressure for preventing rattle noise, which is supplied by the braking driver, is applied,
   wherein the controller is configured to convert the wheel speed signal received from the wheel speed sensor into an acceleration signal, and, when a vibration level value evaluated by processing and analyzing the acceleration signal is not less than a setting value, determine the road surface state of the road as a road surface state in which unevenness exists, and
   wherein the vibration level value is a power spectral density (PSD) value evaluated by performing PSD analysis on the acceleration signal.

2. The control system of claim 1, wherein, when the road surface state in which the unevenness exists is determined from the vibration level value, the controller outputs a control signal for periodically applying the oil pressure for preventing rattle noise.

3. The control system of claim 1, wherein, when the road surface state in which the unevenness exists is determined from the vibration level value, the controller outputs a control signal for periodically applying the oil pressure for preventing rattle noise.

4. The control system of claim 3, wherein vibration level ranges of a plurality of vibration level steps divided based on the vibration level value are previously set in the controller, and a period is set for each vibration level step, so that the period of a step to which the vibration level value evaluated from the wheel speed signal is used as a period for applying the oil pressure for preventing rattle noise.

5. The control system of claim 4, wherein an oil pressure value for preventing rattle noise, which is to be applied to the wheel cylinder, and an oil pressure application time are set together with the period for each step.

6. A control method for reducing rattle noise of a brake caliper, the control method comprising:
   detecting, by a wheel speed sensor, a wheel speed of each wheel to which a caliper device is configured to be mounted;
   determining, by a controller, a vibration level value according to a road surface of a road on which a vehicle is driven by processing and analyzing a wheel speed signal; and
   when the road surface state of the road is determined as a road surface state in which unevenness exists from the determined vibration level value, applying oil pressure for preventing rattle noise to a wheel cylinder of a brake device provided to the wheel,
   wherein the wheel speed signal is converted into an acceleration signal, and, when a vibration level value evaluated by processing and analyzing the acceleration signal is not less than a setting value, the road surface state of the road is determined as a road surface state in which unevenness exists, and
   wherein the vibration level value is a PSD value evaluated by performing PSD analysis on the acceleration signal.

7. The control method of claim 6, wherein, when the road surface state of the road is determined as the road surface state in which the unevenness exists, the oil pressure for preventing rattle noise is applied in a predetermined period.

8. The control method of claim 6, wherein, when the road surface state of the road is determined as the road surface state in which the unevenness exists, the oil pressure for preventing rattle noise is applied in a predetermined period.

9. The control method of claim 6, wherein, when the road surface state of the road is determined as the road surface state in which the unevenness exists, the oil pressure for preventing rattle noise is applied in a predetermined period.

10. The control method of claim 9, wherein vibration level ranges of a plurality of vibration level steps divided based on the vibration level value are previously set, and a period is set for each vibration level step, so that the oil pressure for preventing rattle noise is intermittently applied every period of a step to which the vibration level value evaluated from the wheel speed signal.

11. The control method of claim 10, wherein an oil pressure value for preventing rattle noise, which is to be applied to the wheel cylinder, and an oil pressure application time are set together with the period for each step.

12. The control method of claim 10, wherein, as the range of the vibration level value is increased, the period for applying the oil pressure for preventing noise is set to be decreased.

13. The control method of claim 6, wherein the oil pressure for preventing rattle noise is set as a minimum oil pressure capable of preventing rattle noise generated due to clearances between components by releasing a floating state of the components configured to be in the caliper device.

14. The control method of claim 13, wherein the oil pressure for preventing rattle noise is set as oil pressure at which a piston of the caliper device is configured to be moved to a level where braking power against the vehicle is not generated.

15. The control method of claim 6, wherein the oil pressure for preventing rattle noise is set as oil pressure at which a piston of the caliper device is configured to be moved to a level where braking power against the vehicle is not generated.

* * * * *